(12) United States Patent
Stoddard

(10) Patent No.: X9171
(45) Date of Patent: Oct. 14, 1835

(54) WINDOW SASH, CAST IRON

(76) Inventor: James L. Stoddard

James S. Stoddard, Macedon, New York.
Letters Patent
Dated October 14th 1835.

The Schedule referred to in these Letters Patent and making part of the same, containing a description in the words of the said James S. Stoddard himself of his improvement in the cast iron Window Sash.

---

Be it known that I James S. Stoddard of Macedon, Wayne County, State of New York, have made a new and useful improvement in the Cast Iron Window Sash, which is described as follows:

The muntins and uprights of this window sash are cast similar to those in common use.

The improvement which I have made, and for which I respectfully solicit Letters Patent consists in casting the stiles, bottom and top rails hollow on the sides towards the frame of the window instead of solid as formerly; by which improvement the muntins and uprights are not liable to be cracked by the unequal cooling of the metal; and likewise in producing a much lighter and better sash than the common one.

Witnesses
Wm. C. Elliot
C. H. W. Wharton

Jas. S. Stoddard (182 wds)